United States Patent
Wasada et al.

(10) Patent No.: US 11,693,467 B2
(45) Date of Patent: Jul. 4, 2023

(54) ELECTRONIC DEVICE FUNCTIONALITY IN LOW POWER MODE

(71) Applicant: Apple Inc., Cupertino, CA (US)

(72) Inventors: Langford M. Wasada, Poway, CA (US); Arun Unkn, Cupertino, CA (US); Andrew C. Chang, Sunnyvale, CA (US); Sriram Hariharan, San Jose, CA (US); Robert W. Brumley, San Jose, CA (US); Raman S. Thiara, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/464,482

(22) Filed: Sep. 1, 2021

(65) Prior Publication Data

US 2023/0061200 A1    Mar. 2, 2023

(51) Int. Cl.
*G06F 1/3206* (2019.01)
*H04B 17/318* (2015.01)
*G06F 13/42* (2006.01)
*G06F 21/44* (2013.01)
*G06F 21/30* (2013.01)

(52) U.S. Cl.
CPC ........ *G06F 1/3206* (2013.01); *G06F 13/4282* (2013.01); *G06F 21/305* (2013.01); *G06F 21/44* (2013.01); *H04B 17/318* (2015.01)

(58) Field of Classification Search
CPC .. G06F 1/3206; G06F 13/4282; G06F 21/305; G06F 21/44; H04B 17/318
See application file for complete search history.

(56) References Cited

U.S. PATENT DOCUMENTS

| 8,478,360 B2 | 7/2013 | Soliman |
| 9,554,333 B2 | 1/2017 | Li et al. |
| 9,877,284 B2 | 1/2018 | Seok et al. |

(Continued)

FOREIGN PATENT DOCUMENTS

| EP | 3567938 A1 | 11/2019 |
| EP | 3703431 A2 | 9/2020 |

OTHER PUBLICATIONS

International Search Report & Written Opinion for PCT Application No. PCT/US2022/031178 dated Sep. 6, 2022; 12 pgs.

*Primary Examiner* — Glenn A. Auve
(74) *Attorney, Agent, or Firm* — Fletcher Yoder PC (57) ABSTRACT

Embodiments disclosed herein relate to reducing a power consumption of an electronic device while maintaining some functionality of the electronic device while the electronic device is in a low power mode. The device may be in the low power mode due to a battery level being below a threshold. If the battery level is below the threshold, the electronic device may enter the low power mode. However, before entering the low power mode, some functionality of an application processor may be transferred to a communication controller. Once the functionality is transferred, the application processor may be disabled to reduce power consumption while maintaining functionality of the application processor. The electronic device may also utilize various communication protocols to communicate with a peripheral device. Even though the electronic device may be in the low power mode, the communication controller may be used to cause the peripheral device to perform various actions.

20 Claims, 5 Drawing Sheets

(56) References Cited

U.S. PATENT DOCUMENTS

| | | |
|---|---|---|
| 10,239,494 B2 | 3/2019 | Spiess |
| 2005/0076256 A1* | 4/2005 | Fleck .................... G06F 1/3203 713/320 |
| 2019/0191371 A1* | 6/2019 | Alanen ............. H04W 52/0216 |
| 2019/0346905 A1* | 11/2019 | Song ................. H04W 52/0274 |

* cited by examiner

ELECTRONIC DEVICE FUNCTIONALITY IN LOW POWER MODE

BACKGROUND

The present disclosure relates generally to wireless communication, and more specifically, to electronic device functionality, including wireless device-to-device communication, while in low power mode.

In an electronic device, various components may be used for wireless communication. For example, transmitters and receivers may be coupled to antennas to transmit and receive wireless signals using various communication protocols. For each protocol, the electronic device may include a controller and other electronic components to communicate via the respective protocol. Functionality of the controller and its related electronic components may be limited to the respective protocol and thus may not be compatible with other protocols. Additionally, power may not be supplied to or may be disconnected from certain controllers and electronic components when the electronic device enters a low or reduced power mode or state. As such, wireless communication functionality for use with some protocols may be lost due to various electronic components being turned off by the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

When a battery level of the electronic device is below a threshold, some functionality of the electronic device may be lost. That is, the battery of the electronic device may not have sufficient voltage to support various functions performed by subsystems of the electronic device. In some cases, to conserve battery power, the electronic device (e.g., via a controller and/or processor) may disable (e.g., turn off) certain components and/or functionality of certain components. In some cases, the electronic device may disable an application processor to conserve battery power and prolong battery life of the electronic device. However, turning off the application processor may also disable some wireless communication functionality. It should be understood that disabling or turning off components or devices, as discussed herein, may refer to not supplying power to or disconnecting power from the components or devices. In some cases, power may be supplied to a component and/or subsystem of the electronic device even though it is disabled. For example, an input signal may cause the component and/or subsystem to enter a reset or disabled state until receiving a wake signal to activate the component and/or subsystem.

In some embodiments, the electronic device may be used as a wireless remote (e.g., a keyless entry remote, a keyless ignition remote, or any other suitable keyless operational remote). In that case, when the device enters a low power mode, the application processor may be disabled and, as a results, some wireless functionality used to operate the electronic device as a wireless remote may be disabled. Thus, a user of the electronic device may not be able to access a peripheral device (e.g., a target device of the wireless remote).

To maintain operation of the electronic device as a wireless remote, the disclosed electronic device may transfer some functionality of one or more subsystems and/or components to be disabled due to the low power mode to other components that are not disabled (e.g., active components). In this way, the electronic device may maintain operation of certain functions of the electronic device even though a corresponding component (e.g., controller and/or processor) is disabled.

In one embodiment, a method is presented that includes detecting a battery level of an electronic device. The method also includes causing the electronic device to enter a low power mode based on the battery level by transferring functionality of an application processor of the electronic device to a communication controller of the electronic device and deactivating the application processor. The method also includes, in response to the electronic device entering the low power mode, causing the communication controller to perform the functionality using one or more radios of the electronic device.

In another embodiment, an electronic device is presented that includes a battery and one or more antennas. The electronic device also includes a wireless communication controller communicatively coupled to the one or more antennas. The wireless communication controller may be configured to communicate with and authenticate a peripheral device when a power level of the battery is below a threshold. The electronic device also includes processing circuitry coupled to the wireless communication controller. The processing circuitry is configured to determine the power level of the battery and, in response to detecting that the power level of the battery is below the threshold, transfer functionality of causing the wireless communication controller to communicate with the peripheral device and authenticate the peripheral device to the wireless communication controller, and deactivate.

In yet another embodiment, a user equipment is provided including a power source, and one or more antennas. The user equipment also includes transmit circuitry communicatively coupled to the one or more antennas and receive circuitry communicatively coupled to the one or more antennas. An application processor is communicatively coupled to the one or more antennas via the transmit circuitry and the receive circuitry. A first communication controller is communicatively coupled to the application processor and the one or more antennas via the transmit circuitry and the receive circuitry. The first communication controller is configured to perform one or more functions of the application processor while the power source is in a low power mode. A secure element is communicatively coupled to the first communication controller via a first serial interface. The secure element includes a second communication controller. A third communication controller is communicatively coupled the secure element via a second serial interface, the third communication controller communicatively coupled to the first communication controller via the secure element.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to reducing power consumption of an electronic device while maintaining functionality of wireless communications with peripheral (e.g., peer or target) devices. To reduce power consumption, one or more processors of the electronic device, such as an application processor, may be disabled (e.g., powered off). However, disabling the one or more processors may also disable functionality associated therewith. For example, the one or more processors may enable wireless control of a peripheral device, which may include unlocking an access point (e.g., a door) for a user. To maintain such functionality, the functionality may be transferred to a communication controller of the electronic device that may remain active during the low power mode, such that the communication controller may execute or cause the peripheral device to execute the functionality even when the device is in the low power mode. That is, in a normal operation mode (e.g., a full power or active mode, not the low power mode), the functionality may be performed via the application processor. However, because the application processor is disabled in the low power mode, functionality to, for example, determine to communicate with the peripheral device, communicate with the peripheral device, determine to cause the peripheral device to perform an action, and/or cause the peripheral device to perform the action, may be transferred to the communication controller. In this way, the one or more processors, which may consume a relatively large amount of power, may be disabled while various functionality of the one or more processors may be maintained via the communication controller.

Advantageously, embodiments presented herein provide various apparatuses and techniques to reduce power consumption of an electronic device while maintaining functionality of the electronic device that may be needed to communicate with or access a peripheral device. Further, because the electronic device is in the low power mode, the device may operate without a display being on and/or only with background processes, and, as such, the user may not be aware of the transfer of functionality from the one or more processors to the communication controller. In this way, the electronic device may further reduce power consumption by performing techniques presented herein without having to alert the user of such operations (e.g., the display may not provide any indication to the user of the operations). Moreover, the techniques presented herein may improve an operating efficiency of the electronic device by reducing power consumption.

Figure 1:
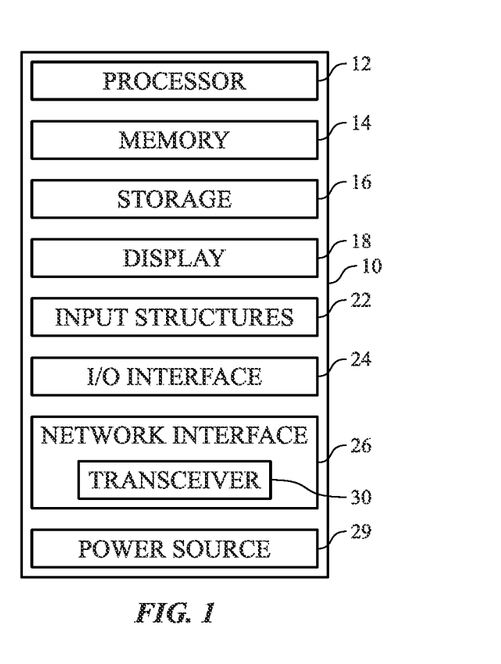
FIG. 1 is a block diagram of an electronic device, according to embodiments of the present disclosure.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface (e.g., a wireless interface) 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network and/or wireless interface 26, and/or the power source 29 may each be communicatively coupled directly or indirectly (e.g., through or via another component, a communication bus, a wireless connection, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, Calif.), a portable electronic or handheld electronic device such as a wireless electronic device or smartphone (e.g., in the form of a model of an iPhone® available from Apple Inc. of Cupertino, Calif.), a tablet (e.g., in the form of a model of an iPad® available from Apple Inc. of Cupertino, Calif.), a wearable electronic device (e.g., in the form of an Apple Watch® by Apple Inc. of Cupertino, Calif.), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network and/or wireless interface 26. In some embodiments, the I/O interface 24 may include an I/O port for a hardwired connection for charging and/or content manipulation using a standard connector and protocol, such as the Lightning connector provided by Apple Inc. of Cupertino, Calif., a universal serial bus (USB), or other similar connector and protocol. The network and/or wireless interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mm-Wave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network and/or wireless interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network and/or wireless interface 26 may include a transceiver 30. In some embodiments, all or portions of the transceiver 30 may be disposed within the processor 12. The transceiver 30 may support transmission and receipt of various wireless signals via one or more antennas. Thus, the transceiver may include a transmitter and a receiver. In some embodiments, the transceiver 30 may include one or more communication controllers for various communication protocols. The communication controllers may be coupled to the transmitter and the receiver and may be used to enable communication between the electronic device 10 during normal operation and/or during a low power mode.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device. In some embodiments, the power source 29 may include or be representative of a power management unit (PMU) which may control distribution of power throughout the electronic device 10. For example, the power management unit may control power supplied to various subsystems and/or components of the electronic device 10, shut down (e.g., turn off) the subsystems and/or components not currently being used, control sleep and/or power functions of the various subsystems and/or components. In this way, the power management unit may conserve battery power of the electronic device 10.

Figure 2:
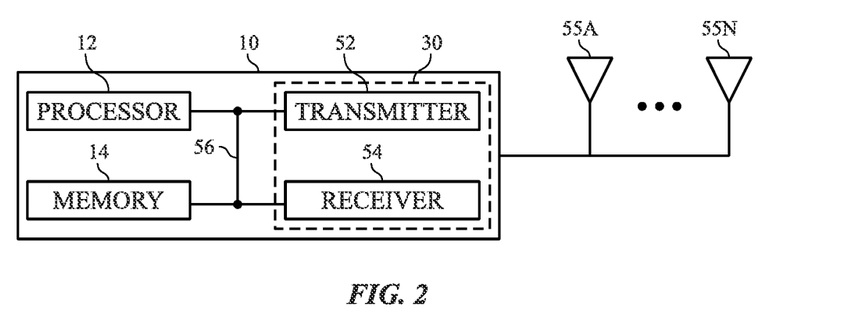
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam.

The electronic device 10 may include multiple transmitters, multiple receivers, multiple transceivers, and/or multiple antennas as suitable for various communication standards. For example, for each of a variety of communication protocols (e.g., BLUETOOTH®, UWB, near-field communication (NFC)), the electronic device 10 may include a respective transceiver 30 (e.g., having a respective transmitter 52 and a respective receiver 54). In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
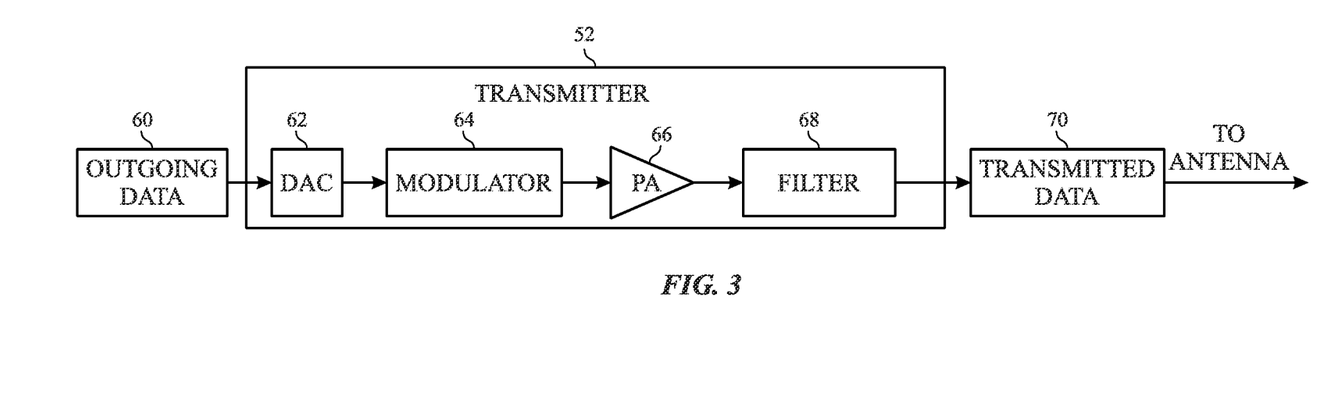
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55.

A filter 68 (e.g., filter circuitry and/or software) of the transmitter 52 may then substantially remove or reduce an impact of undesirable noise from the amplified signal to generate transmitted data 70 to be transmitted via the one or more antennas 55. The filter 68 may include any suitable filter or filters to substantially remove the undesirable noise from the amplified signal, such as a bandpass filter, a bandstop filter, a low pass filter, a high pass filter, and/or a decimation filter. In some cases, the transmitter 52 may include additional or alternative filters and/or filtering at various locations therein. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary). In some cases, the transmitter 52 may include a baseband filter (not shown) between the DAC 62 and the modulator 64.

Figure 4:
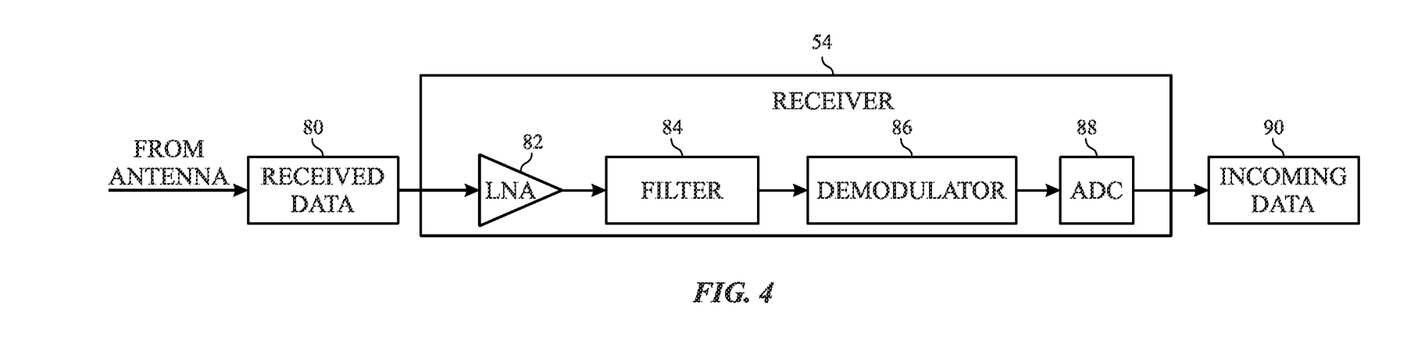
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. In some cases, the filter 84 may be referred to as a baseband filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter. In some cases, the receiver 54 may include a filter between the antenna and the LNA 82. It should be understood that the components of the receiver 54 may be positioned in a different arrangement than shown. For example, in some cases, the filter 84 may be disposed between the demodulator 86 and the ADC 88.

Figure 5:
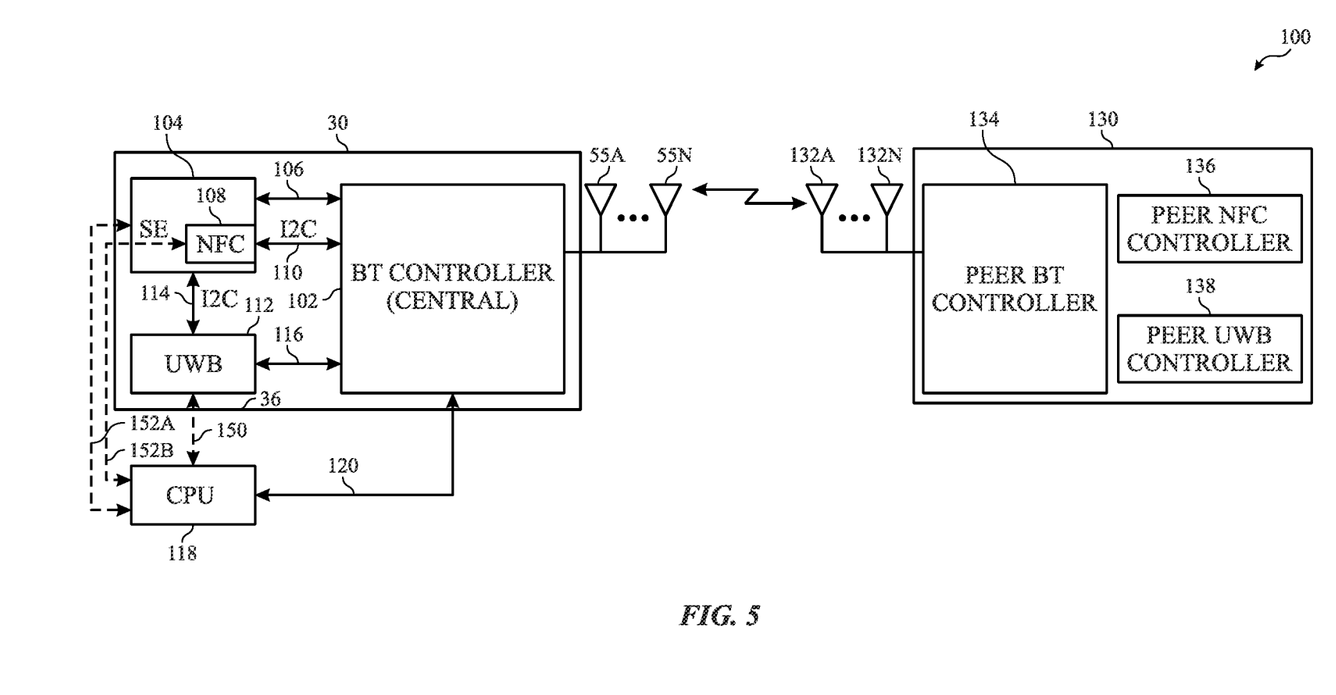
FIG. 5 is a block diagram of a device-to-device communication system including the transceiver of the electronic device of FIG. 1, according to embodiments of the present disclosure.

FIG. 5 is a block diagram of a device-to-device communication system 100 including the transceiver 30 of the electronic device 10 of FIG. 1, according to embodiments of the present disclosure. As shown, the transceiver 30 is communicatively coupled to a central processing unit (CPU) 118 via a path 120. The CPU 118 may be representative of the one or more processors 12, discussed with respect to FIG. 1. For example, the CPU 118 may be representative of an application processor (AP) of the electronic device 10, and an additional processor (e.g., such as a baseband processor) may be coupled to the transceiver 30 and execute instructions to perform various functions to facilitate communication. Although the CPU 118 is illustrated as external to the transceiver 30, it should be understood that the CPU may be part of and/or disposed within the transceiver 30.

The transceiver 30 may include various integrated circuits (e.g., chips) to perform various functions. As shown, the transceiver 30 includes a secure element 104, a first wireless communication controller 102 for a first communication protocol (e.g., BLUETOOTH®), and a second wireless communication controller 112 for a second communication protocol (e.g., ultra-wideband (UWB)). A third wireless communication controller 108 may be disposed within the secure element 104. In some embodiments, an operation range of the various communication protocols employed by the communication controllers 102, 108, 112 may be different.

As discussed above, the transmitter 52 and the receiver 54 of the transceiver 30 may be coupled to one or more of the communication controllers 102, 108, 112. In some embodiments, each communication controller 102, 108, 112 may each include at least one transmitter 52 and at least one receiver 54 associated with the respective communication protocols. The components (e.g., 102, 104, 108, 112) of the transceiver 30 may be distinct integrated circuits, may be disposed on a common integrated circuit, or any combination thereof. It should be understood that the components of the transceiver 30 illustrated in FIG. 5, the arrangement of those components, and the communication protocols employed by the components, are merely examples and that, in operation, the transceiver 30 may include more or fewer components, have a different arrangement, and employ more, less, or the same communication protocols than those shown.

The first communication controller 102 may be communicatively coupled to the secure element 104 via a general-purpose input/output (GPIO) interface 106 and a first serial communication interface 110 (e.g., an inter-integrated circuit (I2C) interface). The second communication controller 112 may be communicatively coupled to the secure element 104 via a second serial communication interface 114 (e.g., an I2C interface). The second communication controller 112 may be communicatively coupled to the first communication controller 102 via a GPIO interface 116.

The serial communication interfaces 110 and 114 may use the same communication protocol, such as I2C, and may be used to transfer data between the respective components. The third communication controller 108 may utilize a third communication protocol, such as near-field communication (NFC). The GPIO interfaces 106 and 116 may be used to transfer single bits related to interface signaling (e.g., time synchronization signals, wake signals, and the like) between the respective components. For example, the first communication controller 102 may transmit a wake signal via the GPIO interfaces 106, 116 to wake or place a target component (e.g., the secure element 104, the third communication controller 108, and/or the second communication controller 112) in an operational state or mode when the component(s) are in a sleep mode. Additionally, or alternatively, the first communication controller 102 may transmit a signal via the GPIO interfaces 106, 116 to indicate that a message according to the communication protocol of the corresponding serial communication interfaces 110, 114 is available for the respective target component 104, 108, 112. In some embodiments, the first communication controller 102 may generate and transmit a signal to synchronize time bases between the first communication controller 102 and the respective target component 104, 108, 112 and/or wake the respective target component 104, 108, 112.

The GPIO interface 116 may not provide a data interface between the first communication controller 102 and the second communication interface 112. Thus, data transferred between the first communication controller 102 and the second communication controller 114 may be transmitted via (e.g., through) the secure element 104 and/or the third communication controller 108. Although not shown, it should be noted that the techniques described herein apply to a transceiver with a serial communication interface (or other data interface) coupled to and directly between the first communication controller 102 and the second communication controller 112.

In operation, the CPU 118 may provide a signal and or data to the first controller 102 via the path 120. For example, the CPU 118 may provide a signal indicating when to start a scanning operation (e.g., for signals from a peer device, such as advertising or beacon signals). If the electronic device 10 is in low power mode, the first controller 102 may be in a sleep mode. In that case, the signal from the CPU 118 may first send a wake signal to the first controller 102 to cause the first controller 102 to transition from the sleep mode to an operational, active, or awake mode. In some cases, the scanning operation may be initiated based on a user input (e.g., a button press on the electronic device 10). That is, a button, graphical input, or other input structure 22 on the electronic device 10 may be to indicate that one or more communication controllers (e.g., the first communication controller 102) is to perform some functionality, such as the scanning operation.

As shown, the first communication controller 102 is communicatively coupled to the one or more antennas 55A-55N. As discussed above, the one or more antennas 55 may transmit and/or receive data between the transceiver 30 of the electronic device 10 and a transceiver of a peripheral (e.g., peer) device 130 (e.g., via one or more antennas 132A-132N of the peripheral device 130). The peripheral device 130 may be representative of any electronic device that can execute an operation or cause an additional device to execute an operation in response to a signal. For example, the peripheral device 130 may be or be part of a vehicle, an access door, a light fixture, a siren, a motor starter, a smart home device, an electrical appliance, and the like. Additionally, it should be understood that the communication system 100 is a device-to-device or peer-to-peer communication system, such that signals are directly exchanged between the electronic device 10 and the peripheral device 130 without an intermediate or intervening device receiving and forwarding the signals (e.g., such as a server). In the case that the peripheral device 130 is a vehicle, the signal received via the antennas 132 may cause an engine to start (or stop), a light to turn on (or off), one or more doors to lock (or unlock), an alarm (e.g., a siren) to sound (or silence), an air conditioning system and/or a heater to activate, and the like. Similar functions may be performed or caused to be performed for different peripheral devices 130.

The peripheral device 130 may include a number of communication controllers. As illustrated, the peripheral device 130 may include at least a first communication controller 134, a second communication controller 138, and a third communication controller 136. The communication controllers 134, 138, and 136 of the peripheral device 130 may correspond to and utilize the same communication protocols as the communication controllers 102, 112, and 108 of the electronic device 10, respectively. The communication controllers 134, 138, and 136 may receive a signal according to the respective communication protocol via the one or more antennas 132 and may cause the peripheral device 130 to execute one or more operations. As discussed above, one example may include causing a door of a vehicle to unlock.

As discussed above, the processor 12 may determine a battery level of the power source 29 of the electronic device 10. If the battery level is below a threshold level, the processor 12 may cause the electronic device 10 to enter a low power mode. The low power mode may disable (e.g., turn off) or decrease power supplied to one or more components of the electronic device 10 to conserve power. For example, the application processor (e.g., represented by the CPU 118) may have many software modules (e.g., applications) running thereon and may communicate with various communication interfaces of the electronic device 10, such as the first communication interface of the first communication controller 102, the second communication interface of the second communication controller 112, and the third communication interface of the third communication controller 108. Thus, the application processor 118 may consume a relatively large amount of power. Accordingly, the electronic device 10 may disable to the application processor 118 to conserve power. However, doing so may also disable functionality that is needed to enable use of the electronic device 10 as a wireless remote.

In some embodiments, the battery threshold level may indicate a power level of the battery (e.g., 1% of the battery capacity or greater, 5% of the battery capacity or greater, 10% of the battery capacity or greater, 20% of the battery capacity or greater, and so on) that enables the electronic device 10 to operate for a period of time (e.g., 1 minute or greater, 10 minutes or greater, 30 minutes or greater, 60 minutes or greater, and so on), or may indicate a power level of the battery that would enable the electronic device 10 to operate for a period of time before the battery level is sufficiently low that certain functions may not be performed and/or before the electronic device 10 loses power completely. For example, when the battery level of the electronic device 10 reaches the battery threshold, the remaining battery power may provide enough power for the electronic device to operate in the low power mode for a range of about 6 hours to about 8 hours.

To prevent functionality needed to enable use of the electronic device 10 from being disabled, some functionality of the application processor 118 may be transferred to one or more components of the electronic device 10 prior to entering the low power mode. For example, some functionality may be transferred from the application processor to the first communication controller 102. The transferred functionality to the first communication controller 102 may include receiving a signal or beacon from the peripheral device 130, initiating measurement of the distance range of the electronic device 10 from the peripheral device 130, authenticating the peripheral device 130, and/or other communications or operations facilitating communications with the peripheral device 130.

In a normal operation mode (e.g., a full power or active mode, not the low power mode), the application processor 118 may execute the functionality that may be transferred to the communication controller in the low power mode. That is, the application processor 118 may, for example, determine to communicate with, communicate with, determine to authenticate, and authenticate the peripheral device 130 (e.g., via the communication controller 102). However, because the application processor 118 may consume a relatively large amount of power compared to the communication controller 102, the application processor 118 may be disabled to conserve battery power when the electronic device 10 is in the low power mode. In that case, before the application processor 118 is disabled, the application processor 118 may transfer at least some of this functionality to the communication controller 102. In some cases, a power management unit of the electronic device 10 may transfer, or cause to be transferred, the functionality from the application processor 118 to the communication controller 102. In some cases, the power management unit may ensure the various communication controllers 102, 108, 112, and the secure element 104 remain powered on (e.g., active) while the electronic device 10 is in the low power mode. Further, the power management unit may disable and/or reduce a power supplied to the application processor 118 to reduce power consumed by the application processor 118.

By transferring functionality of the application processor 118 to the communication controller 102, the electronic device 10, while in low power mode, may maintain functionality to communicate with peripheral devices, such as the peripheral device 130, while reducing overall power consumption of the electronic device 10 (e.g., by disabling the application processor 118). That is, by transferring and maintaining at least some functionality of the application processor 118 via the first communication controller 102, the electronic device 10 may reduce power consumption while ensuring wireless communication capability, even though the electronic device 10 is in low power mode and the application processor is disabled. In this way, an efficiency of the electronic device 10 may be improved while in low power mode.

In some embodiments, one of the communication controllers of the electronic device 10, such as the second communication controller 114, may determine a distance range between the electronic device 10 and the peripheral device 130. For example, the electronic device 10 may determine the distance range from the peripheral device 130 in response to receiving a beacon or other signal from the peripheral device 130 (e.g., via the first communication controller 102). If the second communication controller 114 utilizes UWB, the distance range may be determined based on a time-of-flight of a UWB signal transmitted to the peripheral device 130 via the antennas 55. That is, the time-of-flight of the UWB signal may be determined by measuring a time period for the UWB signal to reach the peripheral device 130 and a response signal from the peripheral device 130 to be received at the electronic device 10. It should be understood that time-of-flight of a UWB signal is provided merely as an example and that other techniques and/or communication protocols may be used to measure the distance range between the electronic device 10 and the peripheral device 130.

Advantageously, measuring the distance range may be used to determine when a signal should be sent to the peripheral device 130 to perform some function. This may increase security of the techniques provided herein by ensuring the electronic device 10 is within a threshold distance range of the peripheral device before attempting to perform a function. For example, if the peripheral device 130 is an access door to a building, a threshold distance range may be used to prevent the door from unlocking before the electronic device 10 is within a reasonable distance range therefrom.

In some cases, the first communication controller 102 may authenticate the peripheral device 130. Authentication may be performed before, after, or during measurement of the distance range between the electronic device 10 and the peripheral device 130. For example, after receiving a beacon (or other signal) from the peripheral device 130, the first communication controller 102 may authenticate the peripheral device 130 by verifying credentials of the peripheral device stored in the electronic device 10, for example, in the secure element 104. That is, a secure connection (e.g., pairing) between the electronic device 10 and the peripheral device 130 may have been established prior to the electronic device 10 entering the low power mode. When the secure connection is established, credentials from the electronic device 10 may be stored in the peripheral device 130 and credentials from the peripheral device 130 may be stored in the electronic device 10. The previously established connection between the electronic device 10 and the peripheral device 130 may further reduce power consumption because the associated credentials are already stored and do not need to be generated, transmitted, received, and/or stored.

Figure 6:
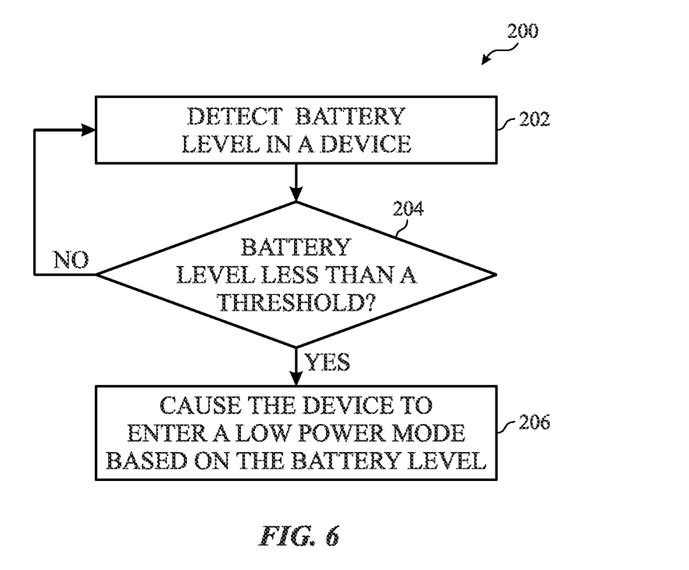
FIG. 6 is a flowchart depicting operations for the electronic device of FIG. 1 to enter a low power mode, according to embodiments of the present disclosure.

FIG. 6 is a flowchart depicting operations 200 for the electronic device 10 to enter a low power mode, according to embodiments of the present disclosure. The operations 200 may be executed by one or more components of an electronic device, such as the electronic device 10 discussed above. For example, the operations 200 may be executed by the one or more processors 12 and cause the transmitter 52 to output a signal to be transmitted via the one or more antennas 55. It should be understood that, while the operations 200 are shown in a specific sequence, the operations 200 may be implemented in any suitable order, and at least some operations 200 may be skipped altogether.

In some cases, the operations 200 may be executed by the application processor 118 and/or a power management unit (e.g., a power management integrated circuit, PMIC). For example, the power management unit may cause the communication controller (e.g., the first communication controller 102) to communicate with the peripheral device 130 while the electronic device 10 is in the low power mode. The power management unit may determine power distribution within the electronic device 10 and determine when the electronic device 10 and/or components of the electronic device 10 should enter different power states or modes of operation (e.g., a full or normal power mode, a low power mode, and so on). Accordingly, the power management unit may be active (e.g., turned on) while the electronic device 10 is in the low power mode. For the communication controllers 102, 108, 112 of the electronic device 10 to perform the functionalities described herein, the power management unit of the electronic device 10 may include hardware and/or software to ensure the communication controllers 102, 108, 112 are powered on (e.g., active) while the electronic device 10 is in the low power mode.

The operations 200 begin at operation 202 where the processor 12 detects a battery level (e.g., level of the power source 29) of the electronic device 10. In some embodiments, the electronic device 10 may include a battery management component (e.g., a power management unit) that monitors a power level of the power source 29. In some embodiments, the battery level may be measured at a regular interval. An interval for measuring a level of the battery may be based at least in part on a current drawn from the battery (e.g., a system load of the battery).

At operation 204, the processor 12 determines if the battery level is below a battery threshold value (e.g., 10% battery remaining, 15% battery remaining, 20% battery remaining, 25% battery remaining, and the like). If the battery level is greater than the threshold value, the operations 200 proceed back to operation 202 to monitor the battery level (e.g., power level) of the electronic device 10. If the battery level is less than the threshold value (e.g., the electronic device 10 has a low battery according to the threshold value), the operations 200 proceed to operation 206, where the processor 12 may cause the electronic device 10 to enter a low power mode based on the battery level detected at operation 202. For example, once the battery level of the electronic device 10 satisfies (e.g., is below) the battery threshold level, the processor 12 may cause the electronic device 10 to enter the low power mode. The low power mode may enable reduced functionality of the electronic device 10 to reduce power consumption of the device 10 and prolong the remaining power of the battery. The low power mode of the electronic device is discussed in more detail below with respect to FIG. 7.

Figure 7:
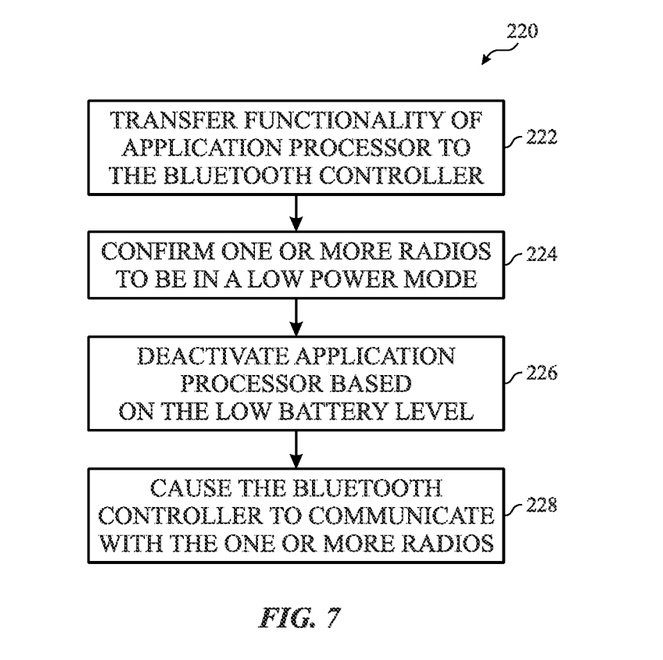
FIG. 7 is a flowchart depicting operations for transferring functionality of an application processor to a communication controller when the electronic device of FIG. 1 enters a low power mode, according to embodiments of the present disclosure.

FIG. 7 is a flowchart depicting operations 220 for transferring functionality of an application processor to a communication controller when entering a low power mode, according to embodiments of the present disclosure. The operations 220 may be executed by one or more components of an electronic device and/or a transmitter of an electronic device, such as the electronic device 10 and the transmitter 52 discussed above. For example, the operations 220 may be executed by the one or more processors 12 and cause the transmitter 52 to output a signal to be transmitted via the one or more antennas 55. That is, at least some of the operations 220 may be performed by the application processor 118 and/or the power management unit. For example, the application processor 118 may perform one or more operations 220 before being deactivated (e.g., powered off). Once the application processor 118 is powered off, the power management unit may execute remaining operations 220. In some cases, the power management unit may cause the application processor to perform one or more operations 220. It should be understood that, while the operations 220 are shown in a specific sequence, the operations 220 may be implemented in any suitable order, and at least some operations 220 may be skipped altogether. The operations 220 may be representative of the operation 206 of FIG. 6 where the electronic device enters a low power mode.

The operations 220 begin at operation 222 where one or more functions normally performed by an application processor, such as the application processor 118, during a normal operation mode may be transferred to a communication controller, such as the first communication controller 102. While the electronic device 10 is in the low power mode and the application processor 118 is disabled, as discussed herein, the one or more functions may be performed by the communication controller 102. In some embodiments, the transfer of functionality may be performed after detecting a low battery level in the electronic device 10 (e.g., a battery level below a battery threshold level), as shown in operation 202 of FIG. 6. In other embodiments, the transfer of functionality may be performed before a battery level of the electronic device 10 is measured. For example, the one or more functions of the application processor 118 may be transferred to the communication controller 102 when the peripheral device 130 is paired with the electronic device 10.

At operation 224, the application processor 118 may be deactivated based on the battery level of the electronic device 10. For example, if the battery level of the electronic device 10 is below the threshold value, the application processor 118 may be deactivated (e.g., powered off). The application processor 118 may also notify the communication controllers 102, 112, 108 of the electronic device 10 that the electronic device 10 is entering into the low power mode and that the application processor will be shut down (e.g., powered off). This enables the communication controllers 102, 108, 112 to communicate among each other without trying to communicate with the application processor 118.

At operation 226, the processor 12 of the electronic device 10 may cause the controller to which the functionality of the application processor was transferred (e.g., the first communication controller 102) to communicate with the peripheral device 130 (e.g., via at least one of the communication controllers 102, 108, 112). That is, the first communication controller 102 (or the communication controllers 108, 112) may execute various functions that the application processor 118 may perform in a normal operation mode, even though the application processor 118 may be disabled in the low power mode. In this way, the electronic device 10 may conserve battery power by disabling the application processor 118 while enabling functionality of the disabled application processor 118 to be executed.

For the electronic device 10 to communicate with the peripheral device 130, the functionality of the application processor 118 may be transferred to the communication controller 102, for example, as firmware. That is, the communication controller 102 emulates the functionality of the application processor 118 via firmware such that, from the viewpoint of the peripheral device 130, it is communicating with the communication controller 102 as if it was the application processor 118. Thus, the peripheral device 130 communicates with the communication controller 102 as if the electronic device 10 was in full power mode and the application processor 118 was running.

Figure 8:
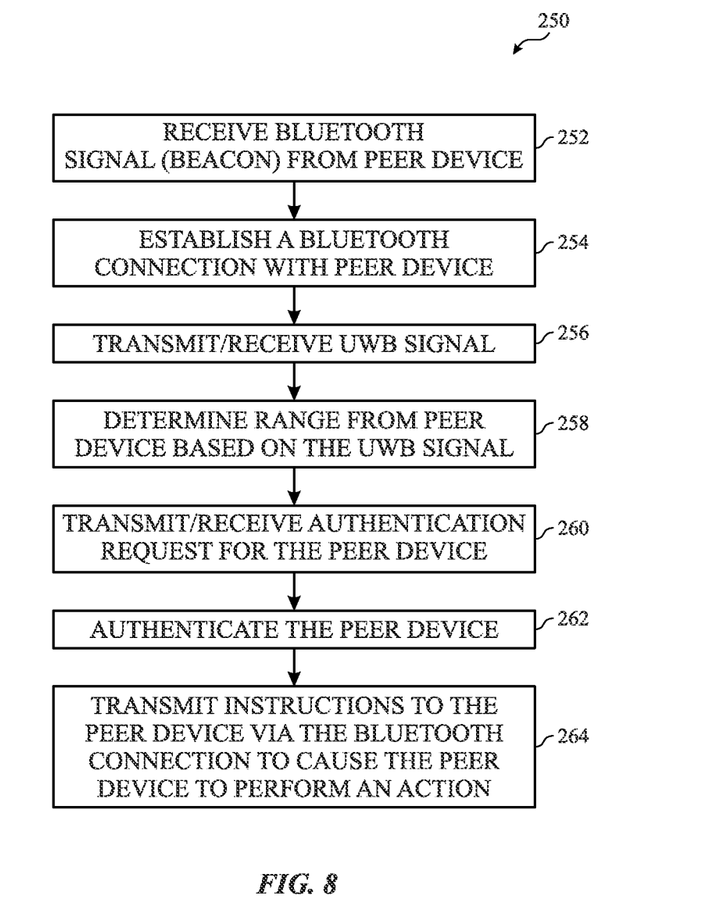
FIG. 8 is a flowchart depicting operations for the electronic device of FIG. 1 to communicate with a peripheral device while in low power mode, according to embodiments of the present disclosure.

FIG. 8 is a flowchart depicting operations 250 for the electronic device 10 to communicate with a peripheral device while in low power mode, according to embodiments of the present disclosure. The operations 250 may be executed by one or more components of an electronic device and/or a transmitter of an electronic device, such as the electronic device 10 and the transmitter 52 discussed above. For example, the operations 250 may be executed by the one or more processors 12 and cause the transmitter 52 to output a signal to be transmitted via the one or more antennas 55. In some cases, the operations 250 may be performed by the application processor 118, the power management unit, a central processing unit of the electronic device 10, or any combination thereof. It should be understood that, while the operations 250 are shown in a specific sequence, the operations 250 may be implemented in any suitable order, and at least some operations 250 may be skipped altogether.

The operations 250 begin at operation 252 where a communication controller of the electronic device 10, such as the first communication controller 102, receives a beacon or other signal from the peripheral device 130. The signal may indicate that the electronic device 10 is within a maximum range of the peripheral device 130 for communications therebetween. In some cases, the signal may be used to initiate an authentication process between the electronic device 10 and the peripheral device 130.

At operation 254, the processor 12 may cause a connection to be established between the electronic device 10 and the peripheral device 130. The connection may be based on the signal received by the electronic device at operation 252. In some cases, establishing the connection between the electronic device 10 and the peripheral device 130 may include authenticating the peripheral device 130 as discussed with respect to FIG. 5. That is, the connection may be established based at least in part on authentication of credentials provided by the peripheral device 130 with credentials stored in, for example, the secure element 104 of the electronic device 10.

At operation 256, the processor 12 may cause one of the communication controllers of the electronic device 10, such as the second communication controller 112, to transmit a signal to the peripheral device 130. As discussed above, the signal from the electronic device 10 may be an ultra-wideband (UWB) signal. At operation 258, the signal may be used to determine a distance range of the peripheral device 130 from the electronic device 10. That is, the distance range may be determined based at least in part on the signal from the electronic device 10. As discussed above, the distance range may be measured based on a time-of-flight of the UWB signal to the peripheral device 130 and a response signal to the electronic device 10.

At operation 260, the electronic device 10 may receive an authentication request from the peripheral device 130. In some cases, the authentication request may include one or more credentials (e.g., authentication keys) associated with the peripheral device 130. In some cases, the credentials may be communicated and/or received by the third communication controller 108 of FIG. 5 using, for example, near-field communication.

At operation 262, the processor 12 may cause an authentication process to be performed. For example, the processor 12 may cause the credentials from the peripheral device 130 to be checked against credentials stored in the secure element 104 of the electronic device 10. That is, when the electronic device 10 and peripheral device 130 are originally paired (e.g., before the electronic device is in low power mode), authentication data may be stored in the electronic device 10. Thus, at operation 262, the processor 12 may compare the stored authentication data and the credentials from the peripheral device 130.

At operation 264, the processor 12 may cause the electronic device 10 to transmit instructions to the peripheral device 130 to perform an action. For example, the processor 12 may cause the first communication controller 102 to transmit an instruction to the peripheral device 130 via the corresponding communication protocol (e.g., a BLUETOOTH® signal). In a normal or active operation mode (e.g., not low power mode), operation 264 may be performed by the application processor of the electronic device 10. However, the application processor may be disabled in low power mode. In that case, the operation 264 may be performed by another component of the electronic device 10, such as the first communication controller 102. In some embodiments, the action may include unlocking an access point (e.g., a door), controlling a motor, initiating an electronic starter, turning on a light, disarming an alarm, or any combination thereof. In some embodiments, the action may include locking the access point, turning off the motor, disabling the starter, arming the alarm, or any combination thereof.

By performing the operations 250 while the electronic device 10 is in a low power mode, the electronic device 10 enables functionality of the application processor even though the application processor is disabled. That is, the operation 250 may be performed while reducing a power consumption of the electronic device 10 and thus may improve an operating efficiency of the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
    detecting a battery level of an electronic device;
    causing the electronic device to enter a low power mode based on the battery level by:
        transferring functionality of an application processor of the electronic device to a communication controller of the electronic device; and
        deactivating the application processor; and
    in response to the electronic device entering the low power mode, causing the communication controller to perform the functionality of the application processor using one or more radios of the electronic device, wherein the functionality comprises authenticating, via the one or more radios and the communication controller, a peripheral device.

2. The method of claim 1, wherein the functionality comprises controlling at least one of a lock, a light, a motor, a starter, an alarm system, an electrical appliance, or other electrical device.

3. The method of claim 1, wherein transferring the functionality of the application processor to the communication controller comprises transmitting the functionality to the communication controller via a serial interface.

4. The method of claim 1, comprising:
    receiving, via the one or more radios and the communication controller, a signal from the peripheral device;
    establishing, via the one or more radios and the communication controller, a connection with the peripheral device based on the signal;
    determining, via the one or more radios and the communication controller, a distance to the peripheral device;
    authenticating, via the one or more radios and the communication controller, the peripheral device; and
    transmitting, via the one or more radios and the communication controller, instructions to the peripheral device to perform an action.

5. The method of claim 4, wherein determining the distance to the peripheral device is based on a time-of-flight of an ultra-wideband signal.

6. The method of claim 4, wherein the action is based at least on the distance between the peripheral device and the electronic device.

7. The method of claim 4, wherein the action includes at least one of unlocking an access point, starting a motor, turning on a light, disabling an alarm, or any combination thereof.

8. The method of claim 4, wherein authenticating the peripheral device comprises:
    receiving, via the one or more radios and the communication controller, authentication credentials from the peripheral device; and
    comparing the authentication credentials to authentication data stored via a secure element of the electronic device.

9. An electronic device comprising:
    a battery;
    one or more antennas;
    a wireless communication controller communicatively coupled to the one or more antennas and configured to communicate with and authenticate a peripheral device when a power level of the battery is below a threshold; and
    processing circuitry coupled to the wireless communication controller and configured to:
        determine the power level of the battery; and
        in response to detecting that the power level of the battery is below the threshold, transfer functionality of the wireless communication controller to communicate with and authenticate the peripheral device to the wireless communication controller, and deactivate the processing circuitry.

10. The electronic device of claim 9, wherein transferring the functionality to the wireless communication controller comprises transmitting the functionality to the wireless communication controller via a serial interface.

11. The electronic device of claim 9, wherein the wireless communication controller is configured to cause the peripheral device to perform at least one of unlocking an access point, starting a motor, turning on a light, disabling an alarm, or any combination thereof, in response to a user input, a distance between the electronic device and the peripheral device being below a distance threshold, or both.

12. The electronic device of claim 9, comprising an ultra-wideband communication controller communicatively coupled to the wireless communication controller and configured to:
    receive a signal from the peripheral device via the one or more antennas and the wireless communication controller; and
    determine a distance to the peripheral device based at least in part on the signal from the peripheral device.

13. The electronic device of claim 12, wherein the distance is based at least in part on a time-of-flight of a signal between the wireless communication controller and the peripheral device.

14. The electronic device of claim 12, comprising:
    a secure element communicatively coupled to the wireless communication controller and configured to store authentication keys for at least the peripheral device; and
    a near-field communication controller communicatively coupled to the secure element and configured to authenticate the peripheral device using the authentication keys in response to the processing circuitry being deactivated.

15. The electronic device of claim 14, wherein the near-field communication controller is configured to:
    receive authentication credentials from the peripheral device via the one or more antennas; and
    authenticate the peripheral device based on comparing the authentication credentials to the authentication keys stored in the secure element.

16. A user equipment comprising:
a power source;
one or more antennas;
transmit circuitry communicatively coupled to the one or more antennas;
receive circuitry communicatively coupled to the one or more antennas;
an application processor communicatively coupled to the one or more antennas via the transmit circuitry and the receive circuitry;
a first communication controller communicatively coupled to the application processor and to the one or more antennas via the transmit circuitry and the receive circuitry, wherein the first communication controller is configured to perform one or more functions of the application processor while the user equipment is in a low power mode;
a secure element communicatively coupled to the first communication controller, the secure element comprising a second communication controller; and
a third communication controller communicatively coupled to the secure element, the third communication controller communicatively coupled to the first communication controller via the secure element.

17. The user equipment of claim 16, wherein the application processor is configured to disable itself when causing the user equipment to enter the low power mode.

18. The user equipment of claim 16, wherein the first communication controller is associated with a first communication protocol, the second communication controller is associated with a second communication protocol, and the third communication controller is associated with a third communication protocol.

19. The user equipment of claim 18, wherein the first communication controller is configured to communicate with an additional first communication controller of a peripheral device using the first communication protocol, wherein the second communication controller is configured to communicate with an additional second communication controller of the peripheral device using the second communication protocol, and wherein the third communication controller is configured to communicate with an additional third communication controller of the peripheral device using the third communication protocol.

20. The user equipment of claim 16, wherein the application processor is configured to transfer the one or more functions to the first communication controller before the user equipment enters the low power mode.

* * * * *

UNITED STATES PATENT AND TRADEMARK OFFICE
CERTIFICATE OF CORRECTION

PATENT NO. : 11,693,467 B2
APPLICATION NO. : 17/464482
DATED : July 4, 2023
INVENTOR(S) : Langford M. Wasada et al.

It is certified that error appears in the above-identified patent and that said Letters Patent is hereby corrected as shown below:

In the Claims

Column 18 Claim 9, Line 25, please replace the phrase "wireless communication controller" with "processing circuitry".

Signed and Sealed this
Eighth Day of October, 2024

Katherine Kelly Vidal
*Director of the United States Patent and Trademark Office*